United States Patent
Marquart et al.

(10) Patent No.: US 12,466,377 B2
(45) Date of Patent: Nov. 11, 2025

(54) METHOD FOR OPERATING A BRAKE SYSTEM OF A MOTOR VEHICLE, CONTROL UNIT, BRAKE SYSTEM

(71) Applicant: Robert Bosch GmbH, Stuttgart (DE)

(72) Inventors: Martin Marquart, Reichenbach (DE); Florian Haag, Ellhofen (DE); Nikolas Loeffelmann, Dielheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 18/687,703

(22) PCT Filed: Dec. 5, 2022

(86) PCT No.: PCT/EP2022/084360
§ 371 (c)(1),
(2) Date: Feb. 28, 2024

(87) PCT Pub. No.: WO2023/117385
PCT Pub. Date: Jun. 29, 2023

(65) Prior Publication Data
US 2024/0383461 A1     Nov. 21, 2024

(30) Foreign Application Priority Data
Dec. 23, 2021   (DE) ..................... 10 2021 214 996.0

(51) Int. Cl.
*B60T 13/66*     (2006.01)
*B60T 7/12*      (2006.01)

(52) U.S. Cl.
CPC ............ *B60T 13/662* (2013.01); *B60T 7/122* (2013.01)

(58) Field of Classification Search
CPC .............................. B60T 13/662; B60T 7/122
See application file for complete search history.

(56) References Cited

U.S. PATENT DOCUMENTS

2008/0262691 A1* 10/2008 Ludwig .................. B60T 7/122
                                                               701/79
2012/0256480 A1* 10/2012 Vollert .................. B60T 8/4845
                                                              303/114.1
(Continued)

FOREIGN PATENT DOCUMENTS

| EP | 1690764 B1   | 10/2007 |
| EP | 2824007 A1   | 1/2015  |
| WO | 2020228963 A1 | 11/2020 |

OTHER PUBLICATIONS

International Search Report for PCT/EP2022/084360, Issued May 2, 2023.

*Primary Examiner* — Sizo B Vilakazi
(74) *Attorney, Agent, or Firm* — NORTON ROSE FULBRIGHT US LLP

(57) ABSTRACT

A method for operating a brake system of a motor vehicle, with a controllable brake booster, and with a brake pedal. In the method, the brake booster is controlled, as a function of an actuation of the brake pedal, to generate a hydraulic pressure in the brake system, the motor vehicle is monitored for a standstill of the motor vehicle, an actuation path of the brake pedal is monitored for an exceedance of a specified limit value, and a holding function for maintaining the hydraulic pressure present in the brake system is activated if a standstill and a limit value exceedance are detected. At least one state variable of the motor vehicle is ascertained and that the limit value is specified as a function of the at least one state variable.

14 Claims, 2 Drawing Sheets

(56) References Cited

U.S. PATENT DOCUMENTS

| | | | |
|---|---|---|---|
| 2013/0211685 A1* | 8/2013 | Ullrich | B60T 8/4081 |
| | | | 701/70 |
| 2014/0277981 A1* | 9/2014 | Svensson | B60T 7/042 |
| | | | 303/155 |
| 2015/0343905 A1* | 12/2015 | Knechtges | B60T 13/745 |
| | | | 303/3 |
| 2020/0122705 A1* | 4/2020 | Reize | B60T 13/62 |

* cited by examiner

__METHOD FOR OPERATING A BRAKE
SYSTEM OF A MOTOR VEHICLE,
CONTROL UNIT, BRAKE SYSTEM__

FIELD

The present invention relates to a method for operating a brake system of a motor vehicle, with a controllable brake booster, and with a brake pedal, the brake booster is controlled, as a function of an actuation of the brake pedal, to generate a hydraulic pressure of the brake system, the motor vehicle is monitored for a standstill of the motor vehicle, an actuation path of the brake pedal is monitored for an exceedance of a specified limit value, and a holding function for maintaining the hydraulic pressure present in the brake system is activated if a standstill and a limit value exceedance are detected.

Furthermore, the present invention relates to a control unit for carrying out such a method and to a brake system with such a control unit.

BACKGROUND INFORMATION

Methods of the type mentioned above are described in the related art. For example, European Patent No. EP 1 690 764 B1 describes a method for controlling a brake system of a vehicle with a hill-holder function, in which a braking force is held independently of an actuation of a brake pedal by a vehicle operator, wherein the function is switched on by applying an additional force to the brake pedal by means of a foot movement of the vehicle operator (and thus an increase in the actuation path of the brake pedal).

SUMMARY

In a method according to an example embodiment of the present invention, at least one state variable of the motor vehicle is ascertained and the limit value is specified as a function of the at least one state variable. The state variable in particular characterizes the hydraulic pressure necessary for holding when activating the holding function. By means of the limit value, which is a function of the state variable and thus changes, it is advantageously ensured that this hydraulic pressure is safely reached at all times. Thus, in particular, a minimum necessary hydraulic pressure for safely holding the motor vehicle is defined and set when activating the holding function. The motor vehicle is safely held at all times. In addition, component protection of components, such as the brake booster, is achieved because no unnecessarily high hydraulic pressure is built up and held within the hydraulic circuit of the brake system. The brake booster is thus advantageously loaded no more than necessary. Preferably, the holding function is deactivated when the limit value is exceeded again. This advantageously ensures that the status of the holding function can be changed or influenced by the driver at all times. It is also preferably provided that an actuation of a clutch pedal and/or of a gas pedal by the driver can additionally or alternatively also be used as a deactivation criterion for the holding function so that the driver is advantageously assisted in a starting process. The deactivation of the holding function preferably takes place with a specified time delay or with a gradual reduction in the hydraulic pressure.

According to a preferred development of the present invention, it is provided that a vehicle weight of the motor vehicle is ascertained as a state variable. By ascertaining a vehicle weight as a state variable, it is advantageously ensured that the motor vehicle is safely held by the holding function even at high load, e.g., at a high payload, i.e., a total weight significantly above the empty weight of the motor vehicle.

Particularly preferably, according to an example embodiment of the present invention, it is provided that a per-axle distribution of the vehicle weight is ascertained. Ascertaining the distribution of the vehicle weight per axle creates a particularly advantageous possibility of distributing the hydraulic pressure as needed to wheel brake devices assigned to the respective front or rear axle. In particular, the wheel brake devices of the axle that is loaded more are subjected to a higher pressure.

According to a preferred development of the present invention, it is provided that at least one brake characteristic value (CP value) of a wheel brake device of the brake system is ascertained as a state variable. The brake characteristic value denotes the ratio of the braking force to the necessary activation force of a wheel brake device and is usually specified as a multiplier to a friction coefficient of a brake pad of the wheel brake device. The friction coefficient is, for example, a function of a temperature and/or a wear state of the brake pad. A separate wheel brake device is usually assigned to each wheel of the motor vehicle. Particularly preferably, a brake characteristic value is ascertained for each of these wheel brake devices. By ascertaining the respective brake characteristic value, it is advantageously ensured that an operating state, in particular a wear state, of the respective wheel brake device is taken into account. Thus, a potentially reduced braking effect is, for example, compensated by increasing the limit value in such a way that the motor vehicle is nevertheless safely held upon activation of the holding function.

Particularly preferably, according to an example embodiment of the present invention, it is provided that an inclination angle of the motor vehicle to a horizontal is ascertained as a state variable. Ascertaining the inclination angle results in the advantage that the motor vehicle is safely held independently of the ambient conditions, in particular also on a steep slope. Herein, the term "horizontal" is understood to mean a direction perpendicular to the direction in which gravity acts. The greater the inclination of the motor vehicle or of the roadway on which the motor vehicle is located is, the greater is usually the hydraulic pressure necessary for safe holding. Preferably, the inclination is ascertained by means of an inertial sensor. If the motor vehicle has come to a stop when driving forward uphill, a greater portion of the vehicle weight loads the rear axle than if the motor vehicle had come to a stop on a plane. On the other hand, if the motor vehicle has come to a stop when driving forward downhill, a greater portion of the vehicle weight loads the front axle. Preferably, the direction of the inclination with respect to a usual forward driving direction of the motor vehicle is therefore also taken into account and, as in ascertaining the vehicle weight per axle as described above, the hydraulic pressure is accordingly distributed to the axles as needed. Particularly preferably, the actual vehicle weight and its per-axle distribution are additionally ascertained for advantageous plausibility checking.

According to a preferred development of the present invention, it is provided that the inclination angle is ascertained as a function of map data of a navigation system of the motor vehicle. The inclination angle is thereby ascertained particularly advantageously and simply without the need for additional sensors of the motor vehicle or the need to evaluate their sensor data. In particular, a planned travel route of the motor vehicle is also taken into account so that the direction of the inclination with respect to the usual forward driving direction of the motor vehicle is also taken into account.

Particularly preferably, according to an example embodiment of the present invention, it is provided that, for setting the holding function, the hydraulic pressure present in the brake system upon activation of the holding function is increased by the brake booster by a specified value, and the increased hydraulic pressure is maintained. This creates a particularly advantageous possibility of detecting the activation of the holding function. For example, the activation of the holding function can thus be detected solely by monitoring the hydraulic pressure or a time curve thereof, and/or can be signaled, for example visually or acoustically, in particular to a driver of the motor vehicle in order to verify, by means of an assistance system, a corresponding activation signal of a control unit responsible for activating the holding function. Thus, in particular, an advantageous safety query is created in the event that the assistance system is notified, for example by the control unit, that the holding function has been activated, without it actually being active, for example due to a malfunction within the brake system. This prevents the driver from inadvertently releasing the brake pedal because they assume that the holding function is activated. If, for example, the brake pedal, together with the brake booster, acts mechanically directly on a piston of a master brake cylinder of the brake system in order to change the hydraulic pressure, a brake pedal counterforce is reduced as the brake booster increases the hydraulic pressure, wherein the brake pedal yields. The driver feels this as haptic feedback so that they are certain that the holding function has been activated, and they can take their foot off the brake pedal. If the brake system is designed as a "brake-by-wire" brake system, in which the brake pedal is not mechanically coupled to the piston but only to a brake pedal force simulator, the brake pedal counterforce is preferably automatically reduced as the brake pedal force simulator increases the hydraulic pressure. In this case, the activation of the holding function is thus also indicated to the driver at the brake pedal by a changed brake pedal force characteristic.

According to a preferred development of the present invention, it is provided that, after activation of the holding function, the hydraulic pressure in the brake system is kept constant when the actuation path of the brake pedal is increased further. This ensures particularly advantageous, permanent component protection for the components of the brake system. As a result of the changing limit value, a minimum necessary hydraulic pressure for safely holding the motor vehicle is already defined and set, as described at the outset. By not allowing a further increase in the hydraulic pressure, which is not necessary for safely holding the vehicle anyway, as long as the holding function is activated, it is ensured that, for example, the brake booster or other components of the brake system are not unnecessarily loaded.

Particularly preferably, according to an example embodiment of the present invention, it is provided that the brake pedal is mechanically decoupled from the brake system, and that the hydraulic pressure is kept constant by disregarding a further increase in the actuation path of the brake pedal until the holding function is deactivated. The component protection described above is thereby particularly advantageously achieved. In the case of the mechanical decoupling of the brake pedal from the brake system, a so-called "brake-by-wire" brake system is present. As already described above, the brake pedal in this case is only coupled to a brake pedal force simulator, which ascertains the actuation path of the brake pedal and passes it to, for example, a control unit for controlling the brake booster. As long as the holding function is activated, a change in this actuation path remains disregarded. Preferably, the pedal force simulator furthermore provides a brake pedal counterforce as a function of the actuation path of the brake pedal, even if the actuation path is increased, so that no unusual change in the brake pedal characteristic is noticeable by a driver of the motor vehicle. However, the brake booster is no longer controlled to further increase the hydraulic pressure because this is not necessary to safely hold the motor vehicle.

According to a preferred development of the present invention, it is provided that, for setting the hydraulic pressure, the brake pedal is mechanically coupled to the brake system, and that the hydraulic pressure is kept constant by controlling the brake booster to compensate for a hydraulic pressure changed by the actuation of the brake pedal. The component protection described above is thereby also particularly advantageously achieved. By mechanically coupling the brake pedal to the brake system, the hydraulic pressure is initially increased when the actuation path of the brake pedal is increased. A control level is now provided, in which this increase is compensated in that an assisting force by the, for example electromechanical, brake booster is reduced to the same extent. Thus, no unusual change in the pedal force characteristic is noticeable by the driver; at the same time, the brake system is advantageously protected from additional, unnecessary loads. Alternatively, the brake booster is controlled only if the actuation path has been increased beyond a further specified limit value and/or for a specified period of time, so that a minor and/or short-term increase in the hydraulic pressure is allowed so that the brake booster does not need to be controlled with every change in the actuation path, no matter how small it is. This also advantageously contributes to component protection.

Particularly preferably, according to an example embodiment of the present invention, it is provided that, after activation of the holding function, a visual, acoustic and/or haptic confirmation is output, in particular on a display device facing a driver of the motor vehicle. This results in the advantage that the driver is immediately informed of the activation. As a result of the feedback, the driver is certain that the holding function has been activated and that they can take their foot off the brake pedal.

A control unit according to the present invention for a brake system of a motor vehicle is specifically configured to carry out the method according to the present invention. This results in the aforementioned advantages.

A brake system according to the present invention for a motor vehicle comprises a controllable brake booster and a brake pedal and is characterized by the control unit according to the present invention. Preferably, the brake booster is designed as an electromechanical brake booster. Alternatively, the brake booster is designed as a negative-pressure or vacuum brake booster and comprises a controllable vacuum pump. This also results in the already mentioned advantages in each case.

Further preferred features and combinations of features result from what is disclosed herein. The present invention is explained in more detail below with reference to the figures.

DETAILED DESCRIPTION OF EXAMPLE EMBODIMENTS

Figure 1:
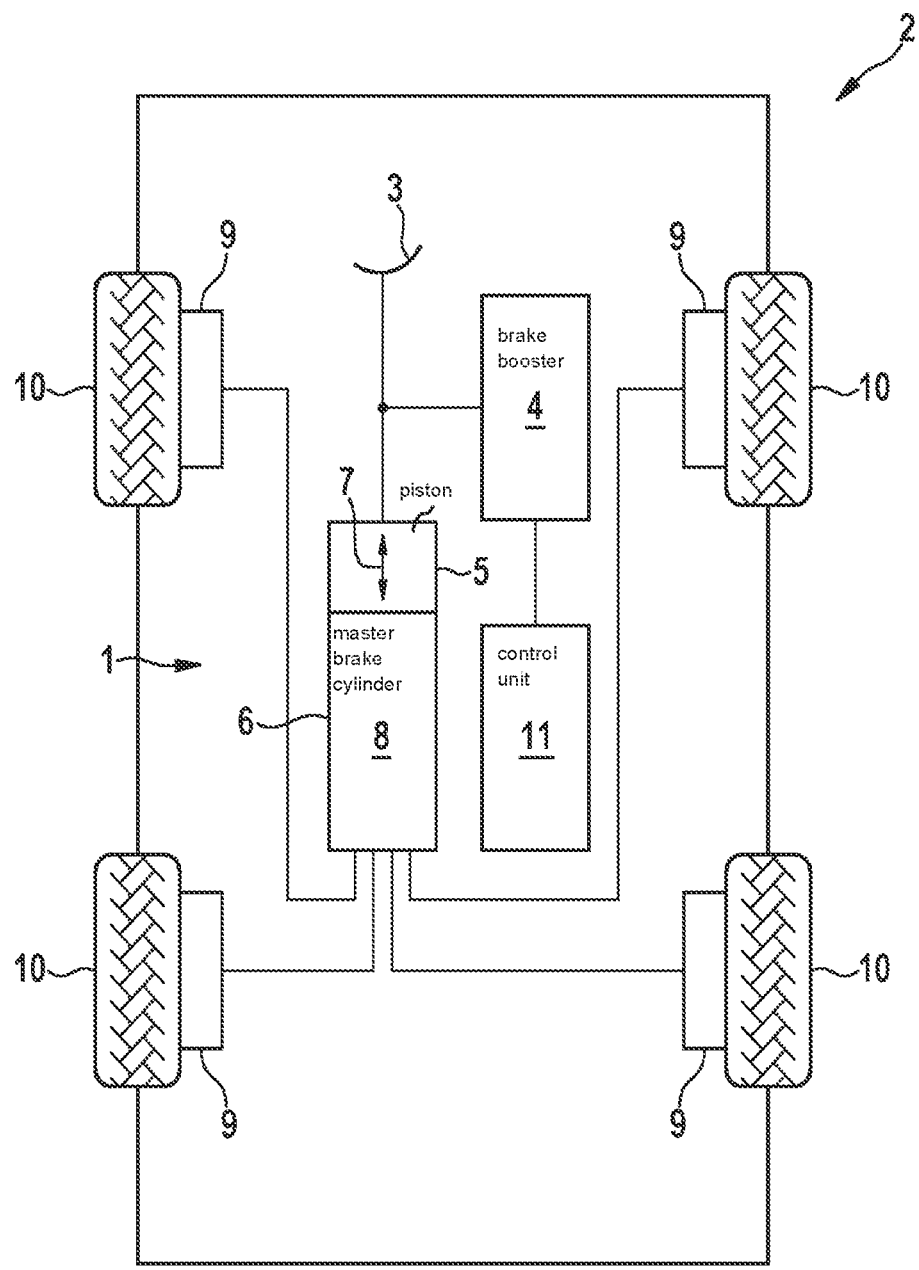
FIG. 1 shows a schematic representation of a brake system, according to an example embodiment of the present invention.

FIG. 1 shows a schematic representation of a brake system 1 of a motor vehicle 2. The brake system 1 comprises a brake pedal 3, which is mechanically coupled to a brake booster 4, for example via an input rod not shown in more detail. The brake booster 4 is mechanically coupled to a piston 5 of a master brake cylinder 6 of the brake system 1. The piston 5 is displaceably mounted in the master brake cylinder 6, as indicated by double arrow 7. A hydraulic fluid 8 is located in the brake system 1, in particular in the master brake cylinder 6 and in lines coming therefrom.

The brake system also comprises four wheel brake devices 9, each of which is assigned to a wheel 10 of the motor vehicle 2. Each of the wheel brake devices 9 has a slave cylinder not shown, which is fluidly connected to the master brake cylinder 6. In order to control the brake booster 4, the brake system also comprises a control unit 11, which is connected by communication technology to the brake booster 4.

The control unit is designed to control an actuating device (not shown) of the brake booster 4 for moving the piston 5. The brake booster 4 is in particular designed as an electromechanical brake booster. The actuating device is then an electric motor, which is mechanically coupled to the piston 5, for example via a gear mechanism, in such a way that the piston 5 is displaced when the electric motor is actuated.

Alternatively, the brake booster 4 is designed as a vacuum brake booster and comprises a vacuum pump as an actuating device. By appropriately controlling the vacuum pump, the negative pressure between two diaphragms of the vacuum brake booster can be adjusted in such a way that the piston 5, which is mechanically coupled to one of the diaphragms, is displaced.

If the piston 5 is now displaced or moved so that the volume in the master brake cylinder 6 is decreased, the hydraulic fluid 8 is thereby conveyed from the master brake cylinder 6 into the slave cylinders of the wheel brake devices 9. A hydraulic pressure in the brake system 1 thus acts via the slave cylinders on the wheel brake devices 9 so that the latter are actuated.

As a rule, the piston 5 is moved by the actuating device as a function of the actuation of the brake pedal 3 by a driver of the motor vehicle 2. For actuating the brake pedal 3, the driver must apply a brake pedal force to the brake pedal 3 in order to overcome a brake pedal counterforce, which is in particular a function of the hydraulic pressure in the brake system 1. The term "brake pedal force" is thus, in particular, to be understood as the force necessary to convey the hydraulic fluid 8 from the master brake cylinder 6 into the slave cylinders.

However, the piston 5 can also be moved by the actuating device independently of the actuation of the brake pedal. Due to the mechanical coupling of the brake booster 4 to the piston 5 and to the brake pedal 3, the brake pedal counterforce is thereby reduced with consistent actuation of the brake pedal 3. The corresponding brake pedal force is likewise reduced accordingly.

In order to ensure that the brake pedal 3 returns to a non-actuated initial position once the driver no longer applies any brake pedal force to the brake pedal 3, a reset device (not shown) is in particular assigned to the brake pedal 3, which reset device pushes the brake pedal 3 into the initial position by means of a spring force. The spring force is then part of the brake pedal counterforce that the driver must overcome during the actuation of the brake pedal 3.

According to a further exemplary embodiment not shown, the brake pedal 3 is alternatively mechanically coupled only to a brake pedal force simulator, by which the brake pedal counterforce can in particular also be set independently of the hydraulic pressure in the brake system 1.

Figure 2:
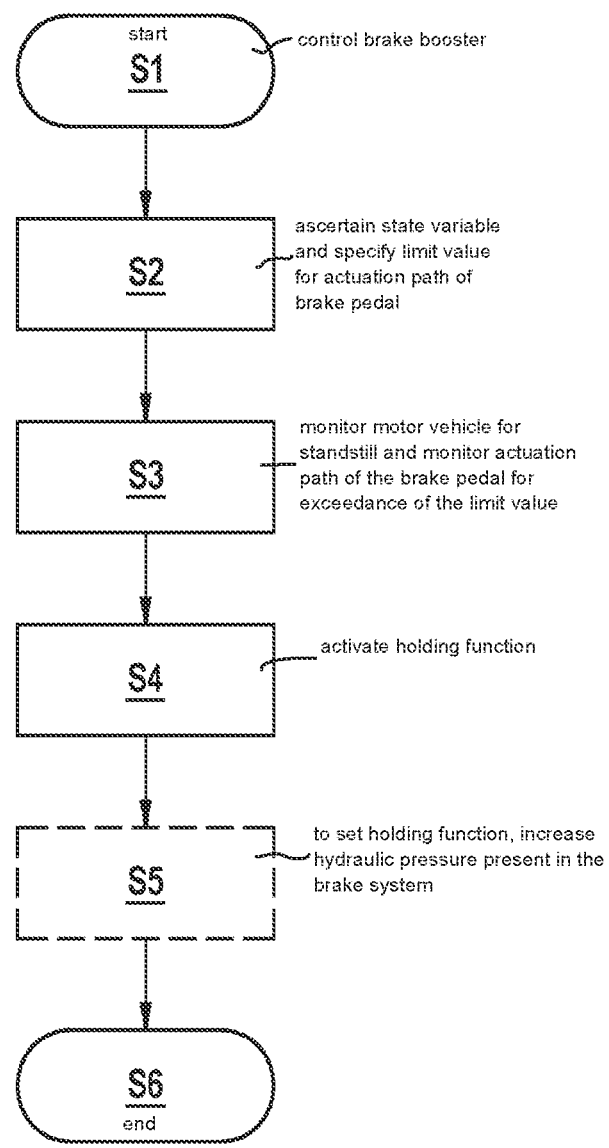
FIG. 2 shows a method for operating the brake system, according to an example embodiment of the present invention.

One advantageous method for operating the brake system 1 of the motor vehicle 2 is described below with reference to FIG. 2. For this purpose, FIG. 2 shows the method in the form of a flow chart. In particular, the method ensures that the motor vehicle 2 is safely held at all times upon activation of a holding function.

In a step S1, the method starts with the brake booster 4 being controlled as a function of the actuation of the brake pedal 3 to generate the hydraulic pressure in the brake system 1. The method thus starts in particular as soon as actuation of the brake pedal 3 has been detected. In particular, the control unit 11 assigned to the brake booster 4 is used to carry out the method.

In a step S2, at least one state variable of the motor vehicle 2 is ascertained, and a limit value for an actuation path of the brake pedal 3 is specified as a function of the state variable. Preferably ascertained as a state variable are a vehicle weight of the motor vehicle 2, in particular also its per-axle distribution, a brake characteristic value of one or more of the wheel brake devices 9, and/or an inclination angle of the motor vehicle 2 to a horizontal. Particularly preferably, the inclination angle is ascertained as a function of map data of a navigation system of the motor vehicle 2.

In a step S3, the motor vehicle 2 is monitored for a standstill of the motor vehicle 2 and an actuation path of the brake pedal 3 is monitored for an exceedance of the limit value specified in step S2. Monitoring in particular takes place on the basis of signals from sensors of the motor vehicle 2, e.g., a wheel speed sensor, or a path sensor assigned to the brake pedal.

The signals are in particular simultaneously sensed and evaluated. Alternatively, monitoring for a standstill takes place first and, if detected, monitoring for a limit value exceedance takes place. Monitoring is continued indefinitely as long as the brake pedal 3 continues to be actuated. Otherwise, the method is initially discontinued and is continued only if the brake pedal 3 is actuated again.

If both a standstill and a limit value exceedance are detected, a holding function is activated in a step S4, in which holding function the hydraulic pressure present in the brake system 1 is maintained independently of the actuation of the brake pedal 3. It is irrelevant to the method which of the two prerequisites occurs first, but they both must be fulfilled so that the holding function can be sensibly activated.

As long as the holding function is activated, the hydraulic pressure in the brake system 1 is preferably kept constant when the actuation path of the brake pedal 3 is increased further. If the brake pedal 3 is mechanically decoupled from the brake system 1, the hydraulic pressure is, for example, kept constant in that a further increase in the actuation path of the brake pedal 3 is disregarded until the holding function is deactivated. On the other hand, if the brake pedal 3 is mechanically coupled to the brake system 1 for setting the hydraulic pressure, the hydraulic pressure is in particular kept constant in that the brake booster 4 is controlled to compensate for a hydraulic pressure changed by the actuation of the brake pedal 3.

In an optional step S5, for setting the holding function, the hydraulic pressure present in the brake system 1 upon activation of the holding function is increased by the brake booster 4 by a specified value, and the increased hydraulic pressure is then maintained. With the activation of the holding function, the hydraulic pressure, which is already specified or set as a function of the actuation of the brake pedal 3, is thus disproportionately increased, preferably abruptly or with a specified change gradient, by the brake booster 4 by moving the piston 5 of the master brake cylinder 6, which is automatically haptically reported back to the driver during the actuation of the brake pedal 3 as a reduction, in particular an abrupt reduction, in the brake pedal counterforce if the brake pedal 3 is mechanically connected to the piston 5 or to the brake booster 4.

In the case of a brake-by-wire brake system in which the brake pedal 3 is mechanically coupled only to a brake pedal force simulator, in step S5, the brake pedal force simulator additionally reduces the brake pedal counterforce proportionally to the increase in the hydraulic pressure so that the driver likewise receives the described haptic feedback.

As an alternative or in addition to this haptic feedback, a visual (e.g., as a message on a display screen or by means of a light signal in a dashboard of the motor vehicle 2), an acoustic (e.g., by means of a signal tone) and/or another haptic confirmation (e.g., by means of a vibration of a pedal or steering wheel) is output to the driver in step S5.

The method ends with a step S6 in which the holding function is deactivated if, for example, actuation of a clutch pedal and/or of a gas pedal is detected by the driver. Deactivation of the holding function then preferably takes place with a specified time delay or with a gradual reduction in the hydraulic pressure, for example in order to assist a starting process.

The invention claimed is:

1. A method for operating a brake system of a motor vehicle, with a controllable brake booster, and with a brake pedal, the method comprising the following steps:
controlling the brake booster, as a function of an actuation of the brake pedal, to generate a hydraulic pressure of the brake system;
monitoring the motor vehicle for a standstill of the motor vehicle;
monitoring an actuation path of the brake pedal for an exceedance of a specified limit value; and
activating a holding function for maintaining the hydraulic pressure present in the brake system when a standstill and a limit value exceedance are detected;
wherein, at least one state variable of the motor vehicle is ascertained, and the limit value is specified as a function of the at least one state variable.

2. The method according to claim 1, wherein a vehicle weight of the motor vehicle is ascertained as a state variable of the at least one state variable.

3. The method according to claim 2, wherein a per-axle distribution of the vehicle weight is ascertained.

4. The method according to claim 1, wherein at least one brake characteristic value of a wheel brake device of the brake system is ascertained as a state variable of the at least one state variable.

5. The method according to claim 1, wherein an inclination angle of the motor vehicle to a horizontal is ascertained as a state variable of the at least one state variable.

6. The method according to claim 5, wherein the inclination angle is ascertained as a function of map data of a navigation system of the motor vehicle.

7. The method according to claim 1, wherein, for setting the holding function, the hydraulic pressure present in the brake system, upon activation of the holding function, is increased by the brake booster by a specified value and the increased hydraulic pressure is maintained.

8. The method according to claim 1, wherein, after activation of the holding function, the hydraulic pressure in the brake system is kept constant when the actuation path of the brake pedal is increased further.

9. The method according to claim 8, wherein the brake pedal is mechanically decoupled from the brake system, and the hydraulic pressure is kept constant by disregarding a further increase in the actuation path of the brake pedal until the holding function is deactivated.

10. The method according to claim 8, wherein the brake pedal is mechanically coupled to the brake system for setting the hydraulic pressure, and the hydraulic pressure is kept constant by controlling the brake booster to compensate for a hydraulic pressure changed by the actuation of the brake pedal.

11. The method according to claim 8, wherein, after activation of the holding function, a visual and/or acoustic and/or haptic confirmation is output.

12. The method according to claim 11, wherein, after activation of the holding function, the confirmation is output on a display device facing a driver of the motor vehicle.

13. A control unit for a brake system of a motor vehicle, the control unit being configured to operate the brake system, with a controllable brake booster, and with a brake pedal, the control unit being configured to:
control the brake booster, as a function of an actuation of the brake pedal, to generate a hydraulic pressure of the brake system;
monitor the motor vehicle for a standstill of the motor vehicle;
monitor an actuation path of the brake pedal for an exceedance of a specified limit value; and
activate a holding function for maintaining the hydraulic pressure present in the brake system when a standstill and a limit value exceedance are detected;
wherein, at least one state variable of the motor vehicle is ascertained, and the limit value is specified as a function of the at least one state variable.

14. A brake system for a motor vehicle, comprising:
a controllable brake booster;
a brake pedal; and
a control unit configured to operate the brake system, the control unit configured to:
control the brake booster, as a function of an actuation of the brake pedal, to generate a hydraulic pressure of the brake system;
monitor the motor vehicle for a standstill of the motor vehicle;
monitor an actuation path of the brake pedal for an exceedance of a specified limit value; and
activate a holding function for maintaining the hydraulic pressure present in the brake system when a standstill and a limit value exceedance are detected;
wherein, at least one state variable of the motor vehicle is ascertained, and the limit value is specified as a function of the at least one state variable.

* * * * *